United States Patent
McNutt et al.

(10) Patent No.: US 7,849,167 B2
(45) Date of Patent: Dec. 7, 2010

(54) DYNAMIC DISTRIBUTED ADJUSTMENT OF MAXIMUM USE OF A SHARED STORAGE RESOURCE

(75) Inventors: Bruce McNutt, Tucson, AZ (US); Barry D. Whyte, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/103,326

(22) Filed: Apr. 15, 2008

(65) Prior Publication Data

US 2009/0259752 A1 Oct. 15, 2009

(51) Int. Cl.
*G06F 15/177* (2006.01)
(52) U.S. Cl. .................. 709/221; 709/220; 709/222; 709/224; 709/226; 709/230
(58) Field of Classification Search ............ None
See application file for complete search history.

(56) References Cited

U.S. PATENT DOCUMENTS

| | | | |
|---|---|---|---|
| 5,426,736 A * | 6/1995 | Guineau, III ............ 710/56 |
| 5,612,909 A * | 3/1997 | Morrow ................ 708/550 |
| 5,960,451 A | 9/1999 | Voigt et al. |
| 5,975,738 A | 11/1999 | DeKoning et al. |
| 6,421,723 B1 * | 7/2002 | Tawil ................... 709/224 |
| 6,636,909 B1 | 10/2003 | Kahn et al. |
| 6,763,437 B1 * | 7/2004 | Nguyen et al. ........... 711/147 |
| 6,922,414 B1 * | 7/2005 | Gunlock ................ 370/412 |

* cited by examiner

*Primary Examiner*—Thu Nguyen
*Assistant Examiner*—Nam Tran
(74) *Attorney, Agent, or Firm*—Scully, Scott, Murphy & Presser, P.C.; Randall Bluestone, Esq.

(57) ABSTRACT

A method, system, computer program product, and computer program storage device for dynamically adjusting a maximum limit of concurrent service requests directed to a shared storage resource that can be issued by a plurality of host devices is disclosed. The method, system, computer program product, and computer program storage device operate based on a rotating turn, in which a host device has a chance to be able to increase its currently available maximum number of concurrent service requests.

16 Claims, 2 Drawing Sheets

INITIATE I/O PROCESSING IN ALL HOSTS $0 \leq n \leq N-1$ — 200

SEND HOST 0 A MESSAGE TO START ITS TURN — 220

DYNAMIC DISTRIBUTED ADJUSTMENT OF MAXIMUM USE OF A SHARED STORAGE RESOURCE

BACKGROUND OF THE INVENTION

1. Field of the Invention

The present invention generally relates to issuing I/O requests directed to a shared storage resource. More particularly, the present invention relates to a method, system and computer program product for optimizing issuance of I/O (Input and Output) requests from a plurality of host devices to a shared storage resource (e.g., a LUN (Logical Unit Number), which is a logical storage unit defined by a protocol) by reducing communication overheads between host devices.

2. Description of the Prior Art

A concern occurs when managing a maximum number of concurrent I/O requests issued to a LUN (i.e., a logical storage unit defined by a protocol) by one engine (i.e., a host device such as a server) of a virtualization appliance (e.g., IBM® SAN Volume Controller) that is operating as a cluster: if the total number of concurrent requests made by all the engines in the cluster becomes too large, then the LUN will respond with a queue fill condition (i.e., a queue in the LUN is full) to some of these requests. For performance reasons, it is desirable to avoid large numbers of occurrences of such queue full conditions. To avoid frequent occurrence of queue full condition in the LUN, the current existing technique is to enforce a maximum number of concurrent service (e.g., I/O service) requests, which is the same for each engine and each LUN. This approach has two very important drawbacks:

1. The current technique does not provide for the possibility that a LUN may be capable of handling a larger volume of concurrent I/O than the set maximum; and
2. The current technique does not provide for variations in demand among the engines. If an engine (i.e., a host device or server) is the only one currently producing service requests to a specific LUN, the engine should be able to increase its currently available maximum number of concurrent service requests to a higher value The present invention addresses drawbacks of the currently existing technique, by providing a dynamic, distributed process for setting a different limit for each shared storage resource (e.g., LUN) and each engine.

SUMMARY OF THE INVENTION

It is therefore an object of the present invention to provide a method, system and computer program product for dynamically adjusting a maximum limit of concurrent service requests directed to a shared storage resource.

In another embodiment, there is provided a system for optimizing a number of I/O requests directed to a shared storage resource that can be issued by each of a plurality of host devices, the shared storage resource accepting service requests from the host devices and performing services for the plurality of host devices, the plurality of host devices capable of communicating over a network, the system comprising:

a queue associated with the shared storage resource for storing the accepted service requests; and a first host device, among the plurality of host devices, for receiving a communication signal via a network from another of the plurality of host devices, to indicate a permission to the first host device for increasing the first host device's currently available maximum number of concurrent service requests, during the first host device's turn, when a no queue full condition exists in the shared storage resource as informed by the shared storage resource, the first host device dynamically adjusting the currently available maximum number of concurrent service requests of the first host device in accordance with the number of currently outstanding service requests issued from the first host device.

In another embodiment, there is provided a method for optimizing a number of I/O requests directed to a shared storage resource that can be issued by each of a plurality of host devices, the shared storage resource accepting service requests from the host devices and performing services for the plurality of host devices, the plurality of host devices capable of communicating over a network, the method comprising:

providing a queue in the shared storage resource for storing the accepted service requests;

at a first host device, among the plurality of host devices, receiving a communication signal from another of the plurality of host devices, to indicate a permission to the first host device for increasing the first host device's currently available maximum number of concurrent service requests; and during the first host device's turn, at the first host device, when a no queue full condition exists in the shared storage resource as informed by the shared storage resource, at the first host device, dynamically adjusting the currently available maximum number of concurrent service requests of the first host device in accordance with the number of currently outstanding services from the first host device.

The present invention provides each engine (i.e., a host device or server), in a rotating fashion (e.g., a round-robin fashion, a pre-determined fashion), with an opportunity to increase its currently available maximum number of concurrent service requests to a given shared storage resource (e.g., LUN). During an engine's turn, if large volumes of service (e.g., I/O) to the shared storage resource (e.g., LUN) are occurring, the engine is allowed to increase its currently available maximum number of concurrent service requests to a given shared storage resource. However, the engine will decrease its currently available maximum number of concurrent service requests to a given shared storage resource, if the engine encounters a queue full condition in the shared storage resource (i.e., a queue in the shared storage resource is full). At the same time, minimal communication is needed among the engines (merely a signal from one engine to the next engine to notify the next engine's turn has come).

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings.

Figure 1:
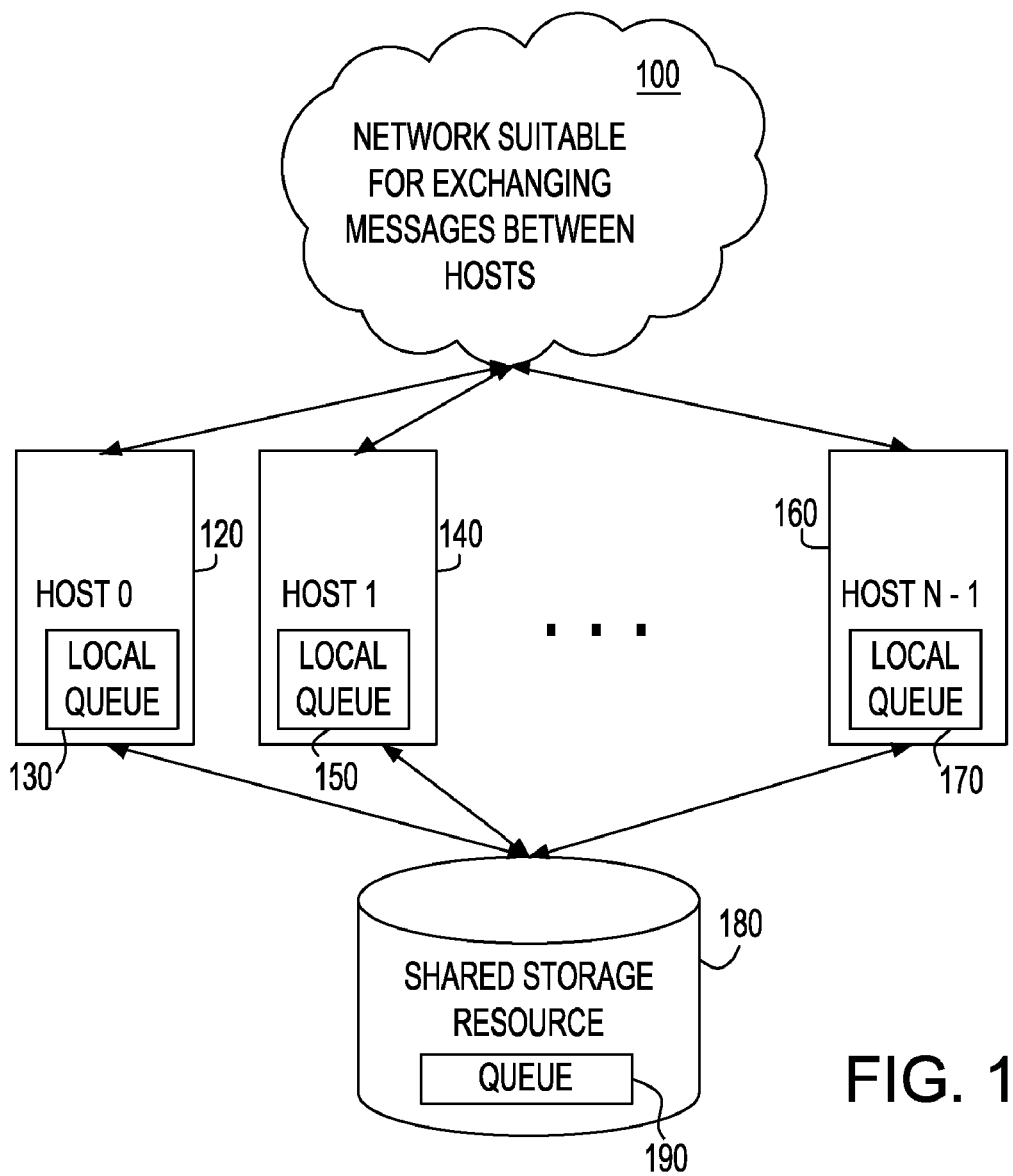
FIG. 1 illustrates an environment where the present invention can be applied.

FIG. 1 depicts an environment where the present invention can be utilized. In the environment, there are a plurality of host devices (i.e., servers) such as Host 0 120, Host 1 140, Host N−1 160, which are connected via a network 100. The network may include one or more of a SAN, SCSI, TCP/IP, LAN, WAN, Wireless LAN, Wireless WAN, NAS, NFS, SMB/CIFS, Internet, etc. In one embodiment, the plurality of host devices communicate with each other via a SAN (Storage Area Network) by sending and receiving a communication signal (e.g., a message). The communication signal will indicate that a receiving host device can increase its currently available maximum number of concurrent service requests. In one embodiment, each host device may include a local queue such as 130, 150, and 170, where service requests (e.g., I/O request), issued at each host device via wireless or wired communication, can wait. Each host device accesses a shared storage resource (e.g., a LUN) 180 to request a service (e.g., I/O request). In one embodiment, the shared storage resource 180 may include a queue 190, where accepted service requests stay. In an alternative embodiment, the shared storage resource 180 may comprise volatile memory or non-volatile memory storage devices.

Figure 2:
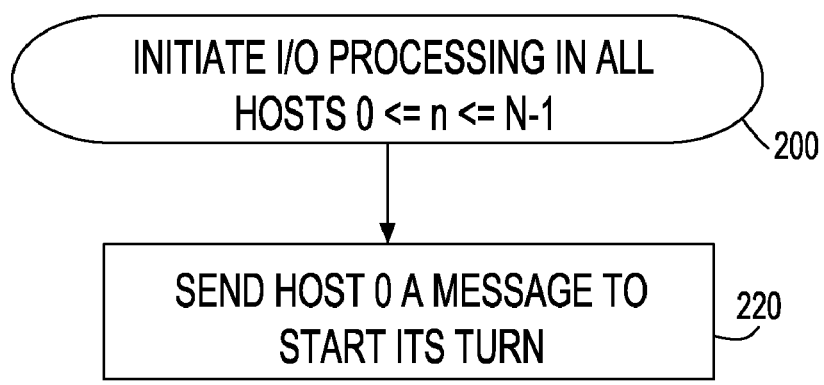
FIG. 2 illustrates a flow chart that the present invention employs at a global level (e.g., a cluster environment).

FIG. 2 depicts steps that occur at a global level (e.g., a cluster level). At step 200, the plurality of host devices such as Host 0 120, Host 1 140, Host N−1 160 send their I/O processing requests to the shared storage resource 180. At step 220, a host (e.g., the Host 0; e.g., first host device) receives a communication signal from another host device to indicate the Host 0's turn to be able to increase the Host 0's currently available maximum number of concurrent service requests (M) by reflecting the number of outstanding service requests from the first host device (e.g., M=Max (M, Outstanding I/O's+1)), unless the Host 0 is informed of an occurrence of a queue full condition (i.e., a queue 190 in the shared resource 180 is full) in the shared storage resource 180 during the Host 0's turn. At the end of the Host 0's turn, the Host 0 may send a communication signal to a next host device (e.g., Host 1) to indicate the next host device's turn to be able to increase that next host device's currently available maximum number of concurrent service requests. In one embodiment, the turn to send/receive the communication signal is determined in a rotating fashion (e.g., a round-robin fashion). In one embodiment, the plurality of host devices communicate with the shared storage resource 180 via SCSI (Small Computer System Interface). SCSI defines a set of standards for physically connecting and transferring data between computers and peripheral devices. Under the SCSI protocol, a host device such as Host 0 120, Host 1 140 and Host N−1 160 is informed of a queue full condition in the shared storage resource 180 as one of the possible outcomes of issuing a service request (e.g., an I/O service request).

Figure 3:
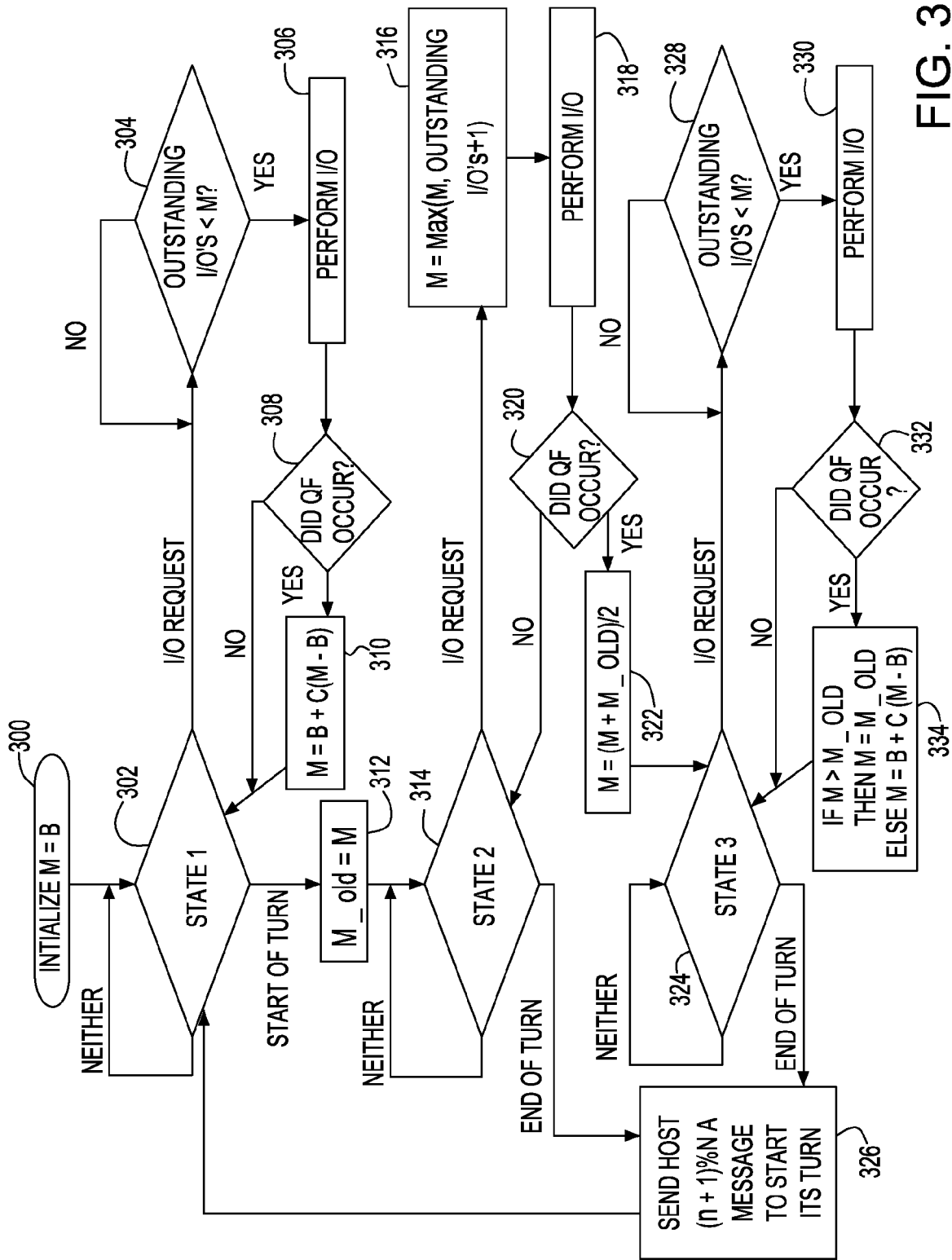
FIG. 3 illustrates a flow chart that the present invention employs at a local level (e.g., at a host device/server level).

FIG. 3 depicts a flow chart that illustrates state changes of a host device n. The following parameters are used in each host device to adjust its maximum service request limit:

M: currently available maximum number of concurrent service requests

B: minimum permitted value of M c: a constant between 0 and 1 (0<c<1), which is used for adjusting the parameter M of a host device.

M_old: previously available maximum number of concurrent service requests (i.e., previous M value)

One ordinary skill in the art can appreciate that all arithmetic formulas shown in the FIG. 3 operate on an integer basis. Therefore, if a result of an arithmetic formula (e.g., M=(M+M_old)/2) generates a result other than an integer, a truncation (e.g., floor function) needs to be performed.

Initially (e.g., immediately following a discovery of a shared storage resource, after rebooting a host device n), the currently available maximum number of concurrent service requests (M) of the host device n is set to its minimum value B (i.e., M=B) at step 300. In one embodiment, all the host devices have a same B value and same c value. In another embodiment, all host devices have a fixed B value. At step 302, the host device n is in State 1 (i.e., a different host device (other than the host device n) is in State 2 or State 3). State 1 indicates that a different host device (other than the host device n) is able to increase the currently available maximum number of concurrent service requests (M) of that different host device. When there is no service (e.g., I/O service) request and the host device n has not received a communication signal (e.g., a message which indicates a permission to the host device n for increasing a parameter value M) to indicate the host device n's turn to be able to increase the currently available maximum number of concurrent service requests (M), the host device n stays in State 1. While staying in State 1, if the host device n has a service (e.g., an I/O service) request, the host device n checks whether the number of outstanding service requests (e.g., the number of issued I/O requests, from the host device n, that have not been completed yet) is less than the currently available maximum number of concurrent service requests (M) at step 304. If the number of outstanding service requests is less than the currently available maximum number of concurrent service requests (M), the host device n issues the service request. Otherwise, the service request from the host device n stays in a local queue of the host device n. After the host device n issues the service request, at step 306, the shared storage resource (e.g., a LUN) accepts the service request. At step 308, the host device n checks whether a queue full condition (i.e., a queue in the shared storage resource is full) is informed from the shared storage resource 180. If the queue in the shared storage resource is not fill, the host device n goes back to State 1 without adjusting the currently available maximum number of concurrent service requests (M). However, if the queue in the shared storage resource is informed from the shared storage resource 180 as being fill, at step 310, the host device n sets the currently available maximum number of concurrent service requests (M) to B+c(M−B) (i.e., M=B+c(M−B)), where c is a constant between 0 and 1.

Basically, when the rotating turn (i.e., the turn to be able to increase the currently available maximum number of concurrent service requests (M)) belongs to any other host device, the number of concurrent service requests (i.e., the number of currently outstanding service requests) from the host device n is kept to the currently available maximum number of concurrent service requests (M) or fewer. In addition, upon receiving a queue full condition in the shared storage resource (i.e., a queue in the shared storage resource is full), the currently available maximum number of concurrent service requests (M) of the host device n is decreased as follows: M=floor(B+c*(M−B)), where c is a constant between 0 and 1. In one embodiment, c may be 0.95.

If the host device n receives a communication signal from another host device (e.g., a host device n−1; e.g., a second host device) to indicate the host device n's turn to be able to increase the currently available maximum number of concurrent service requests (M), the host device n starts its turn by saving the current M value in M_old (i.e., M_old=M) at step 312. The host device n waits in State 2 at step 314 while it is the host device n's turn to be able to increase its M value, and no queue full conditions have occurred in the shared storage resource If there is no service (e.g., I/O service) request, the host device n stays in State 2 without modifying the currently available maximum number of concurrent service requests (M). While staying in State 2, if the host device n has a service request (e.g., an I/O request), then, at step 316, the currently available maximum number of concurrent service requests (M) is set to a maximum value between the currently available maximum number of concurrent service requests (M) of the host device n and one greater than the number of currently outstanding service requests from the host device n (e.g., M=Max (M, Outstanding I/O's+1). Then, at step 318, the host device n issues the service request (e.g., an I/O request) to a shared storage resource. At step 320, the host device n checks whether a queue full condition (i.e., a queue in the shared storage resource is full) is informed from the shared storage resource 180. If the queue in the shared storage resource is not full, the host device n goes back to State 2 without adjusting the currently available maximum number of concurrent service requests (M) (i.e., the host device n can still increase the currently available maximum number of concurrent service requests (M) and has not met a queue full condition in the shared storage resource). However, if the queue in the shared storage resource is full, at step 322, the host device n sets the currently available maximum number of concurrent service requests (M) to (M+M_old)/2 (i.e., M=(M+M_old)/2). While being in State 2, at the end of the host device n's turn, the host device n sends a communication signal to a next host device (e.g., host device (n+1)) to notify the next host device of its turn to be able to increase its currently available maximum number of concurrent service requests (M) at step 326.

During the host device n's turn, if the host device n has met a queue fill condition at least once, at step 324, the host device n waits in State 3 (i.e., it is the host device n's turn and one or more queue full conditions have occurred in the shared storage resource). While in State 3, if there is no service (e.g., I/O service) request, the host device n stays in State 3 without modifying the currently available maximum number of concurrent service requests (M). While staying in State 3, if the host device n has a service request (e.g., an I/O request), the host device n checks whether the number of outstanding service requests (e.g., the number of issued I/O requests, from the host device n, that have not been completed yet) is less than the currently available maximum number of concurrent service requests (M) at step 328. If the number of outstanding service requests is less than the currently available maximum number of concurrent service requests (M), the host device n issues the service request. Otherwise, the service request from the host device n stays in a local queue of the host device n. After the host device n issues the service request, at step 330, the shared storage resource (e.g., a LUN) accepts the service request. At step 332, the host device n checks whether a queue full condition (i.e., a queue in the shared storage resource is full) is informed from the shared storage resource 180. If the queue in the shared storage resource is not full, the host device n goes back to State 3 without adjusting the currently available maximum number of concurrent service requests (M). While staying at State 3, every time the host device n is informed of a queue full condition in the shared storage resource 180, the host device n decreases the currently available maximum number of concurrent service requests (M) of the host device n. For example, at step 334, the host device n may set the currently available maximum number of concurrent service requests (M) of the host device n to the previously available maximum number of concurrent service requests (M_old) of the host device n (i.e., M=M_old), if the currently available maximum number of concurrent service requests (M) is larger than the previously available maximum number of concurrent service requests (M_old). Otherwise, the host device n may set the currently available maximum number of concurrent service requests (M) of the host device n to B+c(M−B) ((i.e., M=B+c(M−B)), where c is a constant between 0 and 1. After decreasing the currently available maximum number of concurrent service requests (M), the host device n goes back to State 3 to check if there is a (waiting) service request while being in State 3, at the end of the host device n's turn, the host device n sends a communication signal to a next host device (e.g., host device (n+1)) to notify the next host device of its turn to be able to increase its currently available maximum number of concurrent service requests (M). at step 326.

When the rotating turn (i.e., the turn to be able to increase the currently available maximum number of concurrent service requests (M)) belongs to the host device n, the number of concurrent service requests (i.e., the number of currently outstanding service requests) from the host device n is not initially constrained to be the currently available maximum number of concurrent service requests (M) or fewer. There are two possible cases:

(a) During the host device n's turn, the host device n has not met a queue fall condition in the shared storage resource. Then, the currently available maximum number of concurrent service requests (M) of the host device n is dynamically adjusted to reflect a maximum value of the number of outstanding service requests during a given period of time (e.g., during the host device n's turn). At the beginning of the turn, a parameter M value is stored in a parameter M_old.

b) During the host device n's turn, the host device n has met one or more queue full conditions in the shared storage resource. Then, the number of concurrent service requests (i.e., the number of currently outstanding service requests) from the host device n is constrained to the currently available maximum number of concurrent service requests (M) or fewer. In addition, the currently available maximum number of concurrent service requests (M) is decreased, every time the host device n is informed of a queue full condition in the shared storage resource from the shared storage resource. When the first queue full condition is met in the shared storage resource, the currently available maximum number of concurrent service requests (M) of the host device n is set to floor(M+M_old)/2). When the queue fall condition in the shared storage resource is encountered a second time, the currently available maximum number of concurrent service requests (M) of the host device n is set to the previously available maximum number of concurrent service requests (M_old), if the currently available maximum number of concurrent service requests (M) is larger than the previously available maximum number of concurrent service requests (M_old). When the queue full condition in the shared storage resource has been met more than twice, the currently available maximum number of concurrent service requests (M) is set to floor(B+c(M−B)).

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for optimizing a number of I/O requests directed to a shared storage resource that can be issued by each of a plurality of host devices, said shared storage resource accepting service requests from said host devices and performing services for said plurality of host devices, said plurality of host devices capable of communicating over a network, said system comprising:

a queue associated with said shared storage resource for storing said accepted service requests; and a first host device, among said plurality of host devices, for receiving a communication signal via a network from another of said plurality of host devices, to indicate a permission to said first host device for increasing said first host device's currently available maximum number of concurrent service requests, during said first host device's turn, when a no queue full condition exists in said shared storage resource as informed by said shared storage resource, said first host device dynamically adjusting said currently available maximum number of concurrent service requests of said first host device in accordance with the number of currently outstanding service requests issued from said first host device;

wherein each host device in said plurality of host devices provides a parameter M whose value indicates a currently available maximum number of concurrent service requests, and a parameter M_old whose value indicates a previously available maximum number of concurrent service requests, wherein the first host device, among said plurality of host devices, decreases said first host device's currently available maximum number of service requests, every time said first host device is informed of a queue full condition in said shared storage resource, wherein during said first host device's turn, if said first host device is informed of the queue full condition in said shared storage resource at least twice and if said currently available maximum number of concurrent service requests (M) of said first host device is larger than said previously available maximum number of concurrent service requests (Mold) of said first host device, setting said currently available maximum number of concurrent service requests (M) of said first host device to said previously available maximum number of concurrent service requests (M_old) of said first host device.

2. The system according to claim 1, wherein each host in said plurality of host devices comprises a local queue for storing said service requests issued at each host device.

3. The system according to claim 1, wherein each host device in said plurality of host devices further provides a parameter B whose value indicates a minimum permitted value of M, and a parameter c whose value indicates a constant value between 0 and 1, one or more said plurality of host devices having a same B parameter value and same c parameter value.

4. The system according to claim 3, wherein if said first host device is informed of the queue full condition in said shared storage resource, during other host device's turn, said currently available maximum number of concurrent service requests (M) of said host first device is set to floor((B+c(M−B)).

5. The system according to claim 3, wherein during said first host device's turn, if said first host device is informed of the queue full condition in said shared storage resource more than twice, said currently available maximum number of concurrent service requests (M) of said first host device is set to floor(B+c(M−B)).

6. The system according to claim 1, wherein during said first host device's turn, if said first host device first is informed of the queue full condition in said shared storage resource, said currently available maximum number of concurrent service requests (M) of said first host device is set to floor((M+M_old)/2).

7. A system for optimizing a number of I/O requests directed to a shared storage resource that can be issued by each of a plurality of host devices, said shared storage resource accepting service requests from said host devices and performing services for said plurality of host devices, said plurality of host devices capable of communicating over a network, said system comprising:

a queue associated with said shared storage resource for storing said accepted service requests; and a first host device, among said plurality of host devices, for receiving a communication signal via a network from another of said plurality of host devices, to indicate a permission to said first host device for increasing said first host device's currently available maximum number of concurrent service requests, during said first host device's turn, when a no queue full condition exists in said shared storage resource as informed by said shared storage resource, said first host device dynamically adjusting said currently available maximum number of concurrent service requests of said first host device in accordance with the number of currently outstanding service requests issued from said first host device;

wherein each host device in said plurality of host devices retains a parameter M whose value indicates a currently available maximum number of concurrent service requests, wherein during said first host device's turn, if said first host device is not informed of the queue full condition in said shared storage resource, said currently available maximum number of concurrent service requests (M) of said first host device is adjusted to a maximum value between said currently available maximum number of concurrent service requests (M) of said first host device and one greater than the number of outstanding service requests from said first host device.

8. A method for optimizing a number of I/O requests directed to a shared storage resource that can be issued by each of a plurality of host devices, said shared storage resource accepting service requests from said host devices and performing services for said plurality of host devices, said plurality of host devices capable of communicating over a network, said method comprising:

providing a queue in said shared storage resource for storing said accepted service requests;

at a first host device, among said plurality of host devices, receiving a communication signal from another of said plurality of host devices, to indicate a permission to said first host device for increasing said first host device's currently available maximum number of concurrent service requests; and during said first host device's turn, when a no queue full condition in said storage resource exists as informed by said shared storage resource, at said first host device, dynamically adjusting said currently available maximum number of concurrent service requests of said first host device in accordance with the number of currently outstanding services from said first host device;

providing parameters to each host device, said parameters comprising one or more of: a parameter value M for indicating a currently available maximum number of concurrent service requests, and a parameter value M_old for indicating a previously available maximum number of concurrent service requests;

at said first host device, among said plurality of host devices, decreasing said first host device's currently available maximum number of service requests, every time said first host device is informed of a queue full condition in said shared storage resource; and during said first host device's turn, if said first host device is informed of the queue full condition in said shared storage resource at least twice and if said currently available maximum number of concurrent service requests (M) of said first host device is larger than said previously available maximum number of concurrent service requests (M_old) of said first host device, setting said currently available maximum number of concurrent service requests (M) of said first host device to said previously available maximum number of concurrent service requests (M_old) of said first host device.

9. The method according to claim 8, further comprising:
providing a local queue at each host device for storing said service requests issued at each host device.

10. The method according to claim 8, further comprising:
providing additional parameters to each host device in said plurality of host devices, said additional parameters comprising one or more of: a parameter B whose value indicates a minimum permitted value of M, and a parameter c whose value indicates a constant value between 0 and 1, wherein one or more of said plurality of host devices have a same B parameter value and same c parameter value.

11. The method according to claim 10, further comprising:
if said first host device is informed of the queue full condition in said shared storage resource, during other host device's turn, setting said currently available maximum number of concurrent service requests (M) of said first host device to floor(B+c(M−B)).

12. The method according to claim 10, further comprising:
during said first host device's turn, if said first host device is informed of the queue full condition in said shared storage resource more than twice, setting said currently available maximum number of concurrent service requests (M) of said first host device to floor (B+c(M−B)).

13. The method according to claim 8, further comprising:
during said first host device's turn, if said first host device first is informed of the queue full condition in said shared storage resource, setting said currently available maximum number of concurrent service requests (M) of said first host device to floor ((M+M_old)/2).

14. A method for optimizing a number of I/O requests directed to a shared storage resource that can be issued by each of a plurality of host devices, said shared storage resource accepting service requests from said host devices and performing services for said plurality of host devices, said plurality of host devices capable of communicating over a network, said method comprising:

providing a queue in said shared storage resource for storing said accepted service requests;

at a first host device, among said plurality of host devices, receiving a communication signal from another of said plurality of host devices, to indicate a permission to said first host device for increasing said first host device's currently available maximum number of concurrent service requests; and during said first host device's turn, when a no queue full condition in said storage resource exists as informed by said shared storage resource, at said first host device, dynamically adjusting said currently available maximum number of concurrent service requests of said first host device in accordance with the number of currently outstanding services from said first host device;

providing a parameter M to each host device, said parameter M indicating a currently available maximum number of concurrent service requests; and during said first host device's turn, if said first host device is not informed of the queue full condition in said shared storage resource, setting said currently available maximum number of concurrent service requests (M) of said first host device to a maximum value between said currently available maximum number of concurrent service requests (M) of said first host device and one greater than the number of outstanding service requests from said first host device.

15. A computer program product comprising non-transitory computer usable medium having computer readable program code means embodied therein for causing a computer to dynamically adjust a maximum limit of concurrent service requests directed to a shared storage resource that can be issued by each of a plurality of host devices, the computer program code means in said computer program product comprising computer readable program code means for causing the computer to effect the functions of claim 8.

16. A computer program storage device, readable by a machine, tangibly embodying a program of instructions executable by a machine to perform method steps for dynamically adjusting a maximum limit of concurrent service requests directed to a shared storage resource that can be issued by each of a plurality of host devices, said method steps comprising the steps of claim 8.

* * * * *